(12) United States Patent
Lee et al.

(10) Patent No.: US 8,477,451 B2
(45) Date of Patent: Jul. 2, 2013

(54) SHROUD INTEGRATED COVER AND HARD DISK DRIVE INCLUDING THE SAME

(75) Inventors: Hyun Chul Lee, Seoul (KR); Il Oung Park, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/417,873

(22) Filed: Mar. 12, 2012

(65) Prior Publication Data

US 2013/0135771 A1 May 30, 2013

(30) Foreign Application Priority Data

Nov. 29, 2011 (KR) .................. 10-2011-0125633

(51) Int. Cl.
*G11B 17/02* (2006.01)
(52) U.S. Cl.
USPC ...................................... 360/99.18

(58) Field of Classification Search
USPC .......... 360/99.18, 99.08, 99.16, 97.11, 97.12, 360/97.13, 97.14, 97.15, 97.16, 97.2, 97.21, 360/264.2, 246.1, 265.5
See application file for complete search history.

(56) References Cited

U.S. PATENT DOCUMENTS

| | | | |
|---|---|---|---|
| 4,583,213 A * | 4/1986 | Bracken et al. | 369/261 |
| 6,529,345 B1 * | 3/2003 | Butler et al. | 360/99.18 |
| 6,633,452 B2 * | 10/2003 | Hirasaka et al. | 360/99.18 |
| 6,754,041 B2 * | 6/2004 | Hong et al. | 360/99.18 |
| 6,922,308 B1 | 7/2005 | Butler | |
| 6,948,176 B2 * | 9/2005 | Cho et al. | 720/600 |
| 7,817,373 B2 * | 10/2010 | Choi et al. | 360/97.19 |
| 2002/0044375 A1 * | 4/2002 | Hirasaka et al. | 360/97.01 |

* cited by examiner

*Primary Examiner* — Allen T Cao

(57) ABSTRACT

There is provided a hard disk drive including: a bottom plate including a disk rotating by a motor; and a cover having a first wall member formed thereon, the first wall member inducing an airflow generated at the time of rotation of the disk.

11 Claims, 5 Drawing Sheets

SHROUD INTEGRATED COVER AND HARD DISK DRIVE INCLUDING THE SAME

CROSS-REFERENCE TO RELATED APPLICATIONS

This application claims the priority of Korean Patent Application No. 10-2011-0125633 filed on Nov. 29, 2011, in the Korean Intellectual Property Office, the disclosure of which is incorporated herein by reference.

BACKGROUND OF THE INVENTION

1. Field of the Invention

The present invention relates to a cover for a hard disk drive and a hard disk drive, and more particularly, to a shroud integrated cover and a hard disk drive including the same.

2. Description of the Related Art

A hard disk drive (HDD), a computer information storage device, reads data stored on a disk or writes data to the disk using a magnetic head.

The hard disk drive may include a plurality of disks, a motor rotating the disks, and a magnetic head reading information stored on the disks.

Generally, since the hard disk drive rotates the plurality of disks at high speed, noise may be generated. In addition, an airflow generated at the time of high speed rotation of the disk may hinder movement of the magnetic head (particularly, a magnetic head driver).

In order to solve this defect, a bottom plate of the hard disk drive is provided with a wall member called a shroud. The shroud is disposed between the disk and the head driver to thereby alleviate a phenomenon in which the head driver is interfered with due to the flow of air.

Meanwhile, in general, the hard disk drive has gradually become lighter and smaller. To this end, the bottom plate of the hard disk drive is manufactured by press processing.

However, since press processing has a limitation in precisely forming several complicated shapes, it may be difficult to form these shapes, including the shroud, integrally with each other on the bottom plate by the press processing.

SUMMARY OF THE INVENTION

An aspect of the present invention provides a shroud integrated cover allowing a hard disk drive to be light and small, and a hard disk drive including the same.

According to an aspect of the present invention, there is provided a shroud integrated cover including: a plate member; and a first wall member formed on the plate member, wherein the first wall member is integrally formed with the plate member by press processing of the plate member.

The shroud integrated cover may further include a second wall member formed on the plate member and disposed to face the first wall member to thereby be paired with the first wall member.

The second wall member may be integrally formed with the plate member by the press processing of the plate member.

The shroud integrated cover may further include a first permanent magnet disposed between the first and second wall members.

At least one of the first and second wall members may include a protrusion engaged with the first permanent magnet.

The first wall member may include a groove engaged with a third wall member formed on a bottom plate of a hard disk drive.

According to another aspect of the present invention, there is provided a hard disk drive including: a bottom plate including a disk rotating by a motor; and a cover including a first wall member formed thereon, the first wall member inducing an airflow generated at the time of rotation of the disk.

The first wall member may be integrally formed with the cover by press processing of the cover.

The cover may further include a second wall member disposed to face the first wall member to thereby be paired with the first wall member.

The second wall member may be integrally formed with the cover by the press processing of the cover.

The hard disk drive may further include a first permanent magnet disposed between the first and second wall members.

At least one of the first and second wall members may include a protrusion engaged with the first permanent magnet.

The bottom plate may include a third wall member facing the first wall member.

The first or third wall member may include a groove in which the first and third wall members are engaged with each other.

The cover may further include a second wall member disposed to face the first wall member to thereby be paired with the first wall member.

The hard disk drive may further include a first permanent magnet disposed between the first and second wall members.

The bottom plate may include third and fourth wall members disposed to respectively face the first and second wall members.

The bottom plate may further include a second permanent magnet disposed between the third and fourth wall members.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

In describing the present invention below, terms indicating components of the present invention are named in consideration of functions of each component. Therefore, the terms should not be understood as being limited technical components of the present invention.

As a computer has gradually become relatively small and thin, a hard disk drive has also gradually become relatively small, thin, and light.

The miniaturization of the hard disk drive may be accomplished by reducing a size of a disk storing digital data therein. However, thinness and lightness of the hard disk drive are limited due to a bottom plate and a cover that are manufactured by die-casting. That is, in order to manufacture the bottom plate and the cover by the die-casting, the bottom plate and the cover need to have a significant thickness, such that it is difficult to accomplish thinness and lightness of the hard disk drive thin and light.

In order to solve this defect, a method of forming a bottom plate and a cover of a hard disk drive by press processing has been suggested.

However, since the bottom plate has several complicated shapes so that devices such as a spindle motor, a disk, a head driver, and the like, are mounted thereon, it may be difficult to manufacture the bottom plate by press processing.

In an embodiment of the present invention for solving this defect, a partial shape of a bottom plate may be formed of a cover to facilitate press processing of the bottom plate and the cover.

Figure 1:
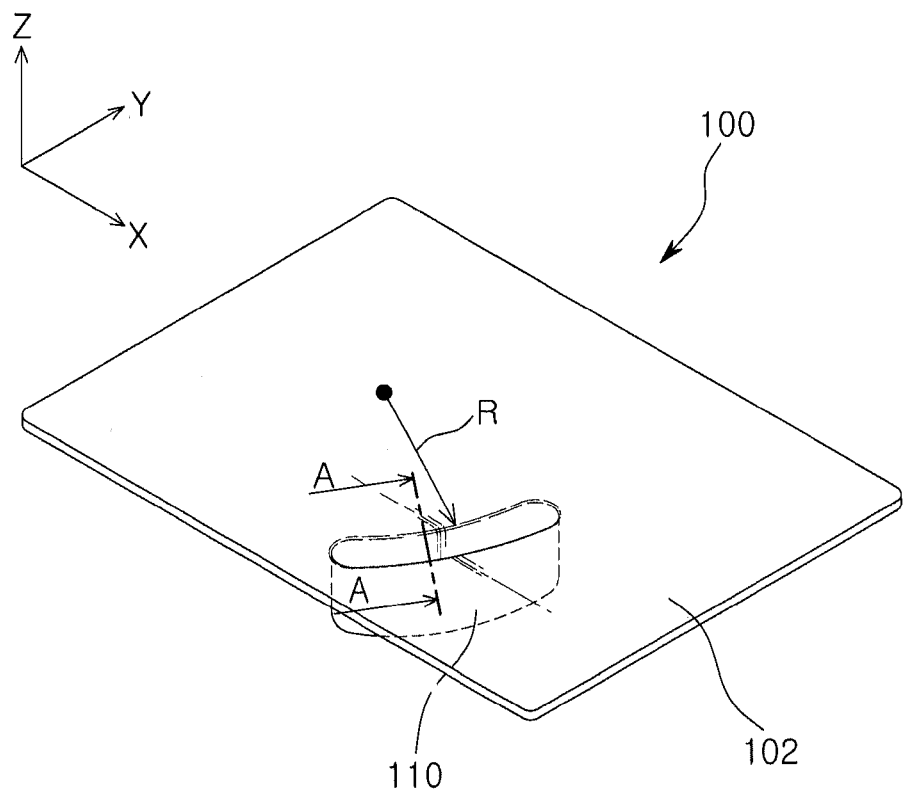
FIG. 1 is a perspective view of a shroud integrated cover according to a first embodiment of the present invention.
Figure 2:
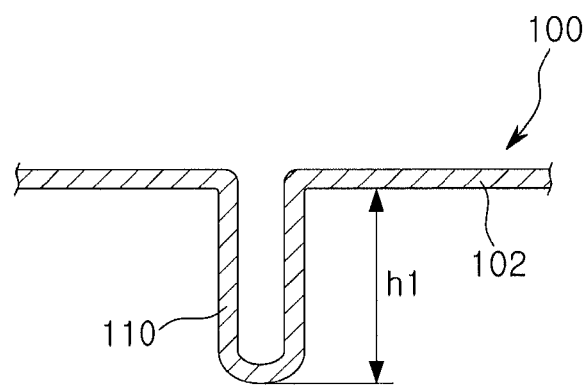
FIG. 2 is a cross-sectional view taken along line A-A of the cover shown in FIG. 1.
Figure 3:
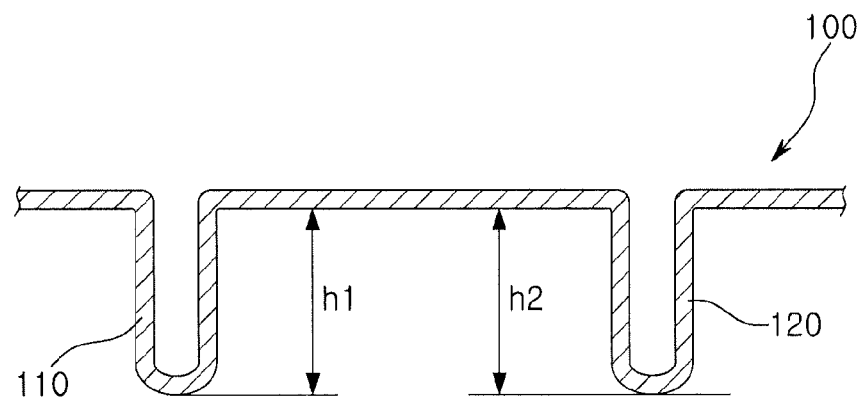
FIG. 3 is a cross-sectional view taken along the line A-A of a shroud integrated cover according to a second embodiment of the present invention.
Figure 4:
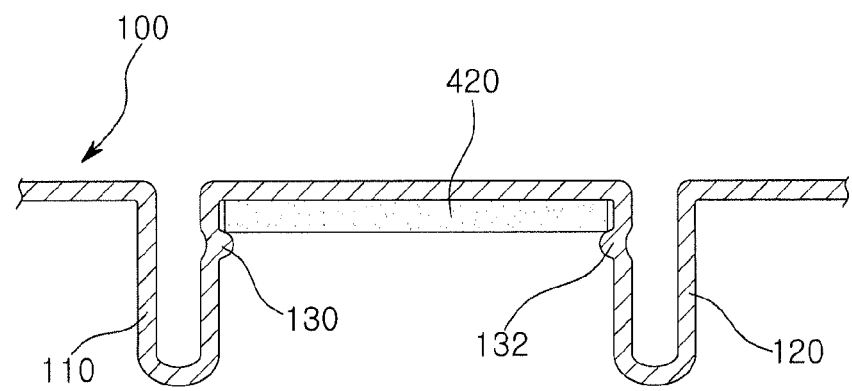
FIG. 4 is a cross-sectional view taken along the line A-A of a shroud integrated cover according to a third embodiment of the present invention.
Figure 5:
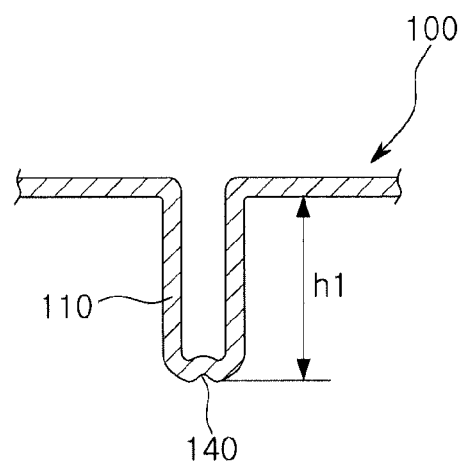
FIG. 5 is a cross-sectional view taken along the line A-A of a shroud integrated cover according to a fourth embodiment of the present invention.
Figure 6:
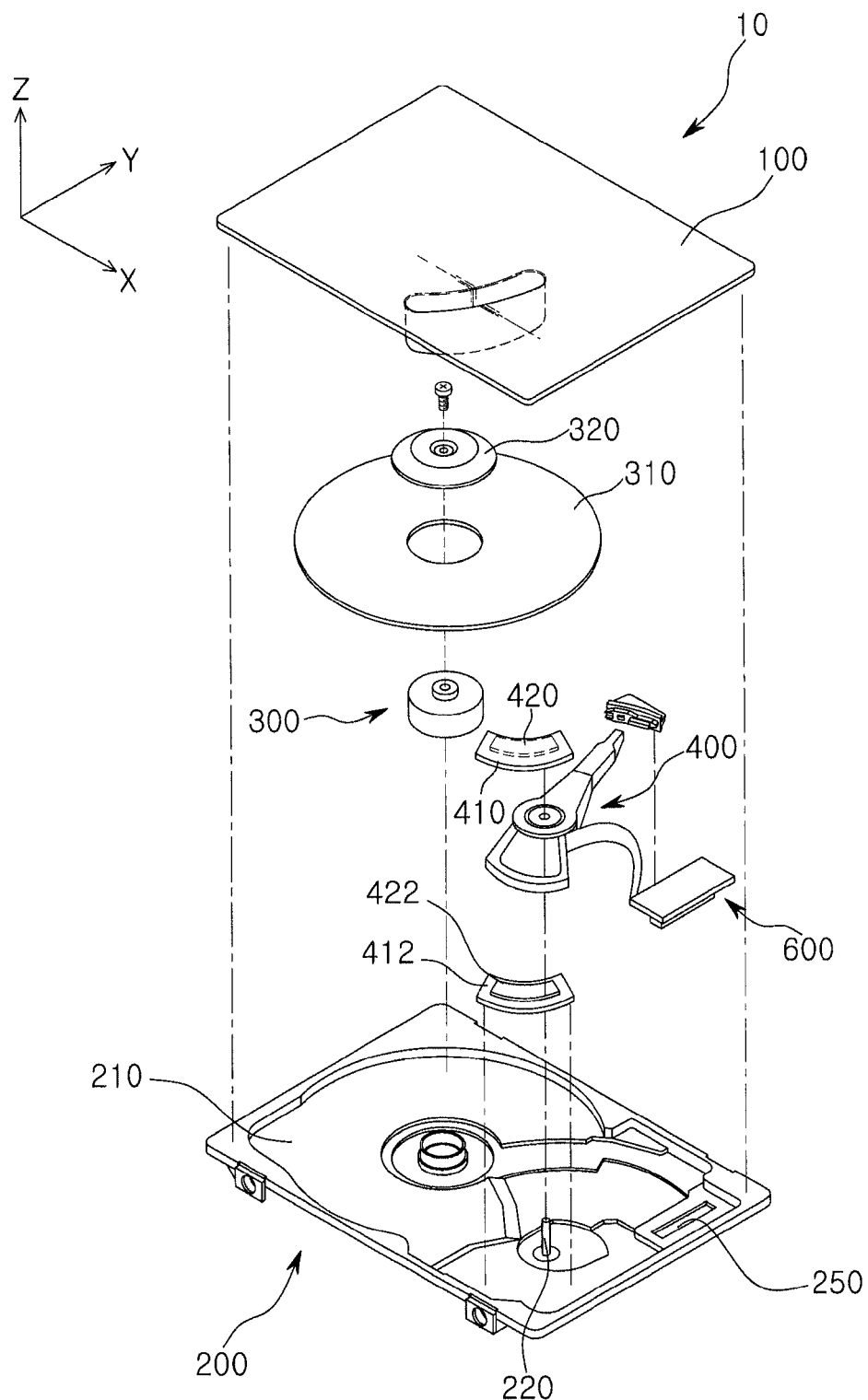
FIG. 6 is an exploded perspective view of a hard disk drive according to the first embodiment of the present invention.
Figure 7:
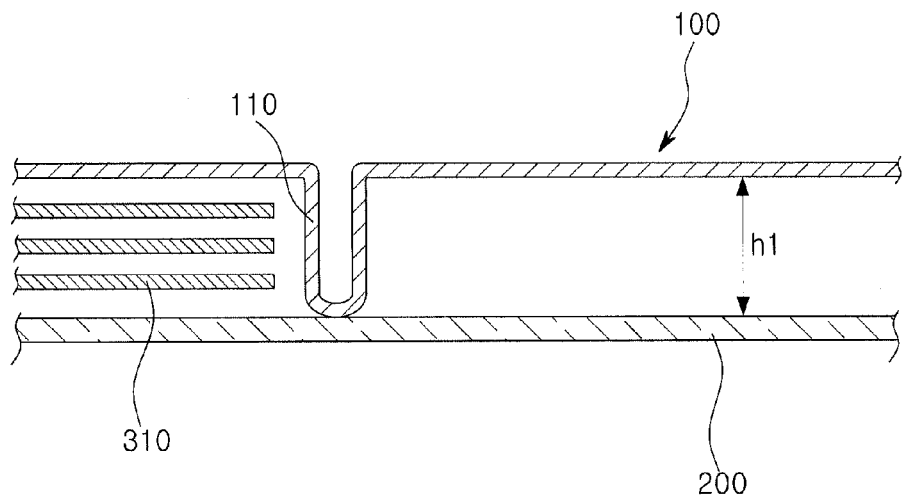
FIG. 7 is a cross-sectional view showing a coupled state between a cover and a bottom plate of the hard disk drive shown in FIG. 6.
Figure 8:
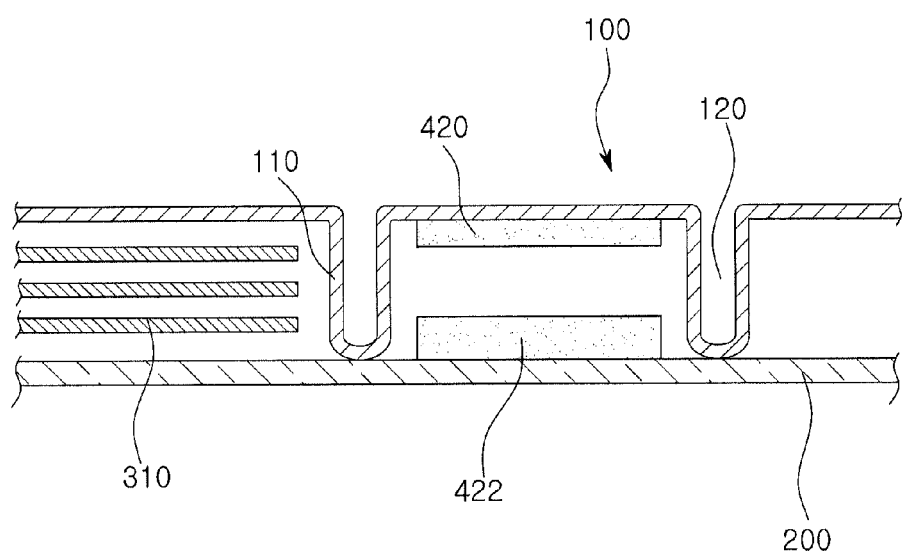
FIG. 8 is a cross-sectional view showing a coupled state between a cover and a bottom plate of a hard disk drive according to the second embodiment of the present invention.
Figure 9:
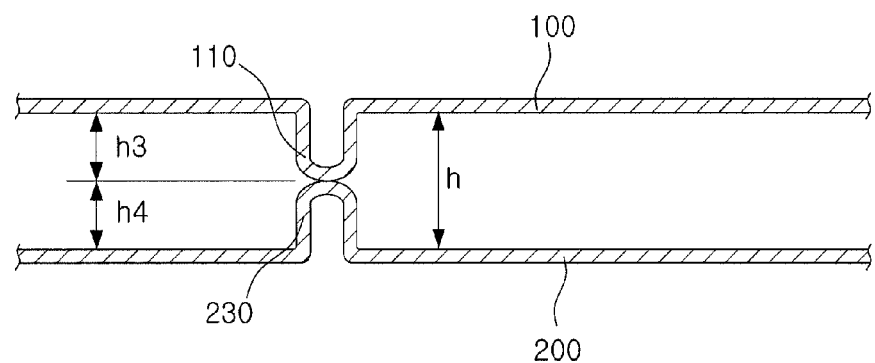
FIG. 9 is a cross-sectional view showing a coupled state between a cover and a bottom plate of a hard disk drive according to the third embodiment of the present invention.
Figure 10:
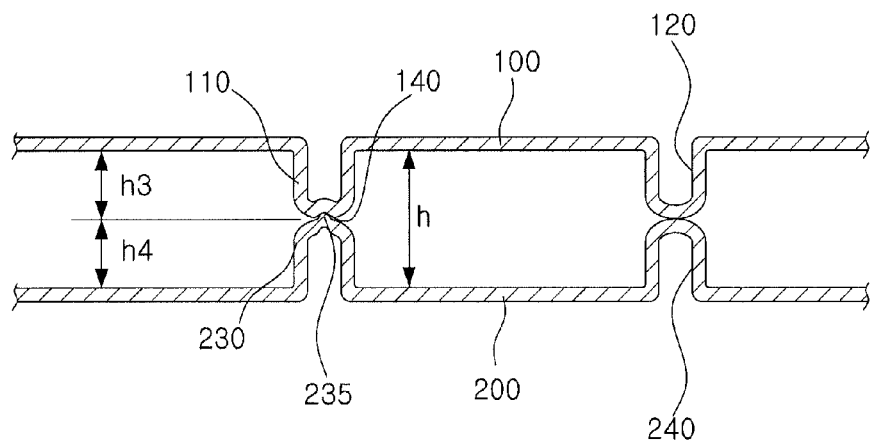
FIG. 10 is a cross-sectional view showing a coupled state between a cover and a bottom plate of a hard disk drive according to the fourth embodiment of the present invention.

FIG. 1 is a perspective view of a shroud integrated cover according to a first embodiment of the present invention; FIG. 2 is a cross-sectional view taken along line A-A of the cover shown in FIG. 1; FIG. 3 is a cross-sectional view taken along the line A-A of a shroud integrated cover according to a second embodiment of the present invention; FIG. 4 is a cross-sectional view taken along the line A-A of a shroud integrated cover according to a third embodiment of the present invention; FIG. 5 is a cross-sectional view taken along the line A-A of a shroud integrated cover according to a fourth embodiment of the present invention; FIG. 6 is an exploded perspective view of a hard disk drive according to the first embodiment of the present invention; FIG. 7 is a cross-sectional view showing a coupled state between a cover and a bottom plate of the hard disk drive shown in FIG. 6; FIG. 8 is a cross-sectional view showing a coupled state between a cover and a bottom plate of a hard disk drive according to the second embodiment of the present invention; FIG. 9 is a cross-sectional view showing a coupled state between a cover and a bottom plate of a hard disk drive according to the third embodiment of the present invention; and FIG. 10 is a cross-sectional view showing a coupled state between a cover and a bottom plate of a hard disk drive according to the fourth embodiment of the present invention.

A cover according to a first embodiment of the present invention will be described with reference to FIGS. 1 and 2.

The cover 100 according to the first embodiment of the present invention may be formed of a plate member 102 and generally have a rectangular shape. In addition, the cover 100 may be formed of a metallic material or a plastic material. The former may be used to protect a hard disk drive from impact applied to the hard disk drive, and the latter may be used to allow the hard disk drive to be light. However, in a case in which the cover 100 is manufactured by press processing, the cover 100 may be formed of the metallic material.

The cover 100 may include a first wall member 110. The first wall member 110 may be formed on one surface (a lower surface based on FIG. 1) of the cover 100.

The first wall member 110 may have a curve-shaped cross section having a radius R based on an X-Y plane as shown in FIG. 1. Here, the radius R may be larger than that of a disk 310 to be described below.

The first wall member 110 may be integrally formed with the cover 100. For example, the first wall member 110 may be formed during a press forming process of the cover 100. The first wall member 110 formed as described above may be connected integrally with the plate member 102, as shown in FIG. 2.

The first wall member 110 may have a first height h1. The first height h1 may be smaller than a thickness of the hard disk drive. More specifically, the first height h1 may be about a height at which the first wall member 110 may contact a bottom plate 200 (See FIGS. 6 and 7) of a hard disk drive.

The first wall member 110 formed as described above may be used as a portion called a shroud in the art to which the present invention pertains. That is, the first wall member 110 may block a head driver from being interfered with due to an airflow generated at the time of high speed rotation of the disk 310 and block noise generated due to the flow of air.

Since the cover 100 configured as described above is integrally formed with the first wall member 110 corresponding to the shroud, a shape of the bottom plate 200 paired with the cover 100 may be simplified. Therefore, the bottom plate 200 may be manufactured by press processing.

Hereinafter, covers according to other embodiments of the present invention will be described with reference to FIGS. 3 through 5.

A cover 100 according to a second embodiment of the present invention may be different from the cover 100 according to the first embodiment of the present invention in that it includes a plurality of wall members 110 and 120.

In FIG. 3, the cover 100 may include first and second wall members 110 and 120. The first wall member 110 may perform a function corresponding to the shroud as described in the first embodiment of the present invention, and the second wall member 120 may improve bending strength of the cover 100.

That is, since the cover 100 formed by press processing is formed of a thin plate member, the cover 100 may be allowed to be relatively light and thin. However, since the cover 100 manufactured as described above is relatively thin as compared to the cover formed by die-casting, it may be easily deformed by external force.

According to the present embodiment, in consideration of this, at least one second wall member 120 may be further formed on the cover 100. Here, since the second wall member 120 may increase support force in a support point at which the cover 100 and the bottom plate 200 are in contact with each other, bending deformation of the cover 100 may be effectively relatively reduced.

The second wall member 120 may have a second height h2. The second height h2 may be equal to or smaller or larger than the first height h1 of the first wall member 110. For example, in a case in which the second wall member 120 contacts a protrusion portion of the bottom plate 200, the second height h2 may be smaller than the first height h1. Unlike this, in a case in which the second wall member 120 contacts a concave portion of the bottom plate 200, the second height h2 may be larger than the first height h1.

A cover 100 according to a third embodiment of the present invention may be different from the cover 100 according to the second embodiment of the present invention in that it further includes a first permanent magnet 420, as shown in FIG. 4.

The hard disk drive may generally include a permanent magnet and a yoke for operating a head driver. Due to these components, a thickness of the hard disk drive may be increased.

According to the present embodiment, in consideration of this defect, first and second wall members 110 and 120 may take the place of the yoke according to the related art, and the first permanent magnet 420 may be directly attached to the cover 100.

Meanwhile, the first permanent magnet 420 may be attached to the cover 100 via an adhesive. However, as needed, the first permanent magnet 420 may be fixed by respectively forming protrusions 130 and 132 on the wall members 110 and 120 as shown in FIG. 4. Here, the protrusions 130 and 132 may be simultaneously formed by press processing of the cover 100 or be formed by separate post-processing.

A cover 100 according to a fourth embodiment of the present invention may be different in shape of a first wall member 110 from the covers according to the above-mentioned embodiments of the present invention, as shown in FIG. 5. That is, in FIG. 5, the first wall member 110 may have a concave groove 140.

This shape may increase a contact area between the first wall member 110 and the bottom plate 200, such that support force of the cover 100 by the first wall member 110 may be improved. In addition, since the groove 140 of the first wall member 110 has a structure in which it may be easily engaged with a protrusion of the bottom plate 200, coupling force between the cover 100 and the bottom plate 200 may be increased.

Hereinafter, a hard disk drive according to the first embodiment of the present invention will be described with reference to FIGS. 6 and 7.

The hard disk drive 10 according to the first embodiment of the present invention may include a cover 100, a bottom plate 200, a spindle motor 300, a head driver 400, a ramp, and a circuit board 600.

The cover 100 may be a protecting unit protecting internal components of the hard disk drive 10. To this end, the cover 100 may be formed of a metallic material and be firmly coupled to the bottom plate 200. For reference, since the cover 100 according to the present embodiment may be the same as the cover 100 shown in FIG. 1, a detailed description thereof will be omitted.

The bottom plate 200 may be a basic portion of the hard disk drive 10. The bottom plate 200 may be formed of a metallic material, similar to the cover 100. More specifically, the bottom plate 200 may be formed by press processing in order to allow the hard disk drive 10 to be light and thin. The bottom plate 200 may include a disk mounting part 210, a pivot axis 220, and a connector penetrating part 250.

The disk mounting part 210 may be a concave space having a shape coinciding with an appearance of a disk 310. The disk mounting part 210 may be integrally formed with the bottom plate 200 during a press forming process of the bottom plate 200.

The pivot axis 220 may be disposed outside the disk mounting part 210 and be coupled to the head driver 400. The pivot axis 220 may have a pin shape and be formed after the press forming process of the bottom plate 200

The connector penetrating part 250 may have a hole shape vertically penetrating through the bottom plate 200. More specifically, the connection penetrating part 250 may have the same shape as that of a cross section of a connector connecting the hard disk drive 10 and an external device to each other. For example, the connector penetrating part 250 may have a rectangular shape.

The connector penetrating part 250 may have the circuit board 600 mounted thereon and an external connector inserted thereinto. That is, the external connector may be connected to the circuit board 600 through the connector penetrating part 250.

The spindle motor 300, to rotate the disk 310, may be fixedly mounted on an approximately central portion of the bottom plate 100.

The disk 310 may have a storage space in which data may be written. More specifically, a first surface (an upper surface of FIG. 6) and s second surface (a bottom surface) of the disk 310 may be a storage space in which data may be written. The disk 310 may be coupled to the spindle motor 300 to thereby rotate at the time of an operation of the spindle motor 300.

The spindle motor 300 may have a clamp 320 coupled thereto. The clamp 320 may be coupled to the spindle motor 300 to thereby fix the disk 310 to the spindle motor 300. The clamp 320 may be coupled to the spindle motor 300 by a bolt.

Meanwhile, in FIG. 6, a single disk 310 may be mounted on the spindle motor 300. However, as needed, a plurality of disks 310 may be mounted on the spindle motor 300. In this case, an interval maintaining member may be disposed between the disks 310 in order to maintain an interval therebetween.

The head driver 400 may include a magnetic head and dispose the magnetic head at any point on the disk 310. Here, the magnetic head may write data to the disk 310 and read the data written on the disk 310. For reference, the head driver 400 according to the present embodiment may be a head stack assembly (HSA) generally called in the art to which the present invention pertains.

The head driver 400 may include a driving unit operated by magnetic force of a permanent magnet 420. For example, the head driver 400 may include a voice coil motor (VCM).

The head driver 400 configured as described above may rotate clockwise or counterclockwise according to a direction of current supplied thereto and dispose the magnetic head on the disk 310. Meanwhile, although not shown in FIG. 6, the head driver 400 may be connected to the circuit board 600.

Yokes 410 and 412 and permanent magnets 420 and 422 may be formed on the cover 100 and the bottom plate 200. More specifically, the yoke 410 and the permanent magnet 420 may be formed on the cover 100, and the yoke 412 and the permanent magnet 422 may be formed on the bottom plate 200.

The yokes 410 and 412 and the permanent magnets 420 and 422 disposed as described above may generate magnetic force in the head driver 400 to enable driving of the head driver 400.

The circuit board 600 may be disposed on the connection penetrating part 250. The circuit board 600 may include electronic components and control circuits for controlling the spindle motor 300 and the head driver 400.

The circuit board 600 may be a flexible board. For example, the circuit board 600 may be manufactured in a film form. Since the circuit board 600 having this form is not subject to a limitation in an installation space, it may be used to allow the hard disk drive to be small and thin.

In the hard disk drive 10 configured as described above, the first wall member 110 corresponding to the shroud is formed on the cover 100, as shown in FIG. 7. Therefore, the hard disk drive 10 may be utilized to allow the bottom plate 200 to be light or reduce a manufacturing cost of the bottom plate 200.

That is, according to the present embodiment, since a shape corresponding to the shroud may be removed from the bottom plate 200, a shape of the bottom plate 200 may be simplified, and the bottom plate 200 may be manufactured by press processing, unlike the case according to the related art.

Therefore, according to the present embodiment, the hard disk drive 10 may be allowed to be relatively light and thin, and a manufacturing cost of the bottom plate 200 may be relatively reduced.

Hereinafter, hard disk drives according to other embodiments of the present invention will be described with reference to FIGS. 8 to 10.

A hard disk drive according to the second embodiment of the present invention may include a cover 100 including a plurality of wall members 110 and 120.

In FIG. 8, the cover 100 may include first and second wall members 110 and 120. The first wall member 110 may perform a function corresponding to the shroud, and the second wall member 120 may improve bending strength of the cover 100.

That is, since the cover 100 formed by press processing is formed of a relatively thin plate member, the cover 100 may be allowed to be relatively light and thin. However, since the cover 100 manufactured as described above is thin as compared to the cover formed by die-casting, it may be easily deformed by external force.

According to the present embodiment, in consideration of this, at least one second wall member 120 may be further formed on the cover 100. Here, since the second wall member 120 increases support force in a support point at which the cover 100 and the bottom plate 200 are in contact with each other, bending deformation of the cover 100 may be effectively relatively reduced.

In addition, the first and second wall members 110 and 120 may take the place of a yoke. That is, according to the present embodiment, the first and second wall members 110 and 120 may serve as the yokes 410 and 412 shown in FIG. 6. Therefore, according to the present embodiment, each of the permanent magnets 420 and 422 may be formed directly on the cover 100 and the bottom plate 200.

In the hard disk drive configured as described above, since the yokes 410 and 412 may be omitted, a manufacturing cost of the hard disk drive may be relatively reduced, and the hard disk drive may be allowed to be relatively lighter.

Hard disk drives according to third and fourth embodiments of the present invention may be different in shape of a cover 100 and a bottom plate 200 from the hard disk drive according to the above-mentioned embodiments of the present invention. That is, in the hard disk drives according to the third and fourth embodiments of the present invention, wall members 230 and 240 may be formed on a bottom plate 200 as shown in FIGS. 9 and 10.

The cover 100 may include a first wall member 110. The first wall member 110 may be extended to be long toward the bottom plate 200 and have a third height h3. Here, the third height h3 may be smaller than a design height h required for mounting several components in an inner portion of the hard disk drive.

The bottom plate 200 may include a third wall member 230. The third wall member 230 may be extended to be long toward the cover 100. More specifically, the third wall member 230 may contact the first wall member 110 and perform a function of the shroud together with the first wall member 110.

The third wall member 230 may have a fourth height h4. The fourth height h4 may be smaller than the design height h and be smaller than the third height h3 of the first wall member 110. However, the entire height h3+h4 of the first and third wall members 110 and 230 may be the same as the design height h.

In the hard disk drive formed as described above, since the wall members 110 and 230 corresponding to the shroud are separately and respectively formed on the cover 100 and the bottom plate 200, press processing may be relatively easily performed on the cover 100 and the bottom plate 200. That is, according to the present embodiment, since wall members having the same height as that of the shroud need not to be formed on the cover 100 and the bottom plate 200, it may be applied to press processing having a limitation in processing shape.

A hard disk drive according to the fourth embodiment of the present invention may include a plurality of wall members 110, 120, 230, and 240. In addition, according to the present embodiment, first and third wall members 110 and 230 may be engaged with each other by coupling between a groove 140 and a protrusion 235.

This structure may improve coupling force and adhesive force between the wall members 110 and 230 that are in contact with each other.

As set forth above, according to the embodiments of the present invention, since the wall member serving as a shroud is formed on the cover, the press forming of the bottom plate may be easily performed.

In addition, according to the embodiments of the present invention, since both of the cover and the bottom plate may be manufactured by the press processing, the hard disk drive may be easily fabricated to be small and thin.

While the present invention has been shown and described in connection with the embodiments, it will be apparent to those skilled in the art that modifications and variations can be made without departing from the spirit and scope of the invention as defined by the appended claims.

What is claimed is:

1. A shroud integrated cover comprising:
a plate member;
a first wall member formed on the plate member;
a second wall member formed on the plate member and disposed to face the first wall member to thereby be paired with the first wall member; and
a first permanent magnet disposed between the first and second wall members,
at least one of the first wall member and the second wall member being integrally formed with the plate member by press processing of the plate member.

2. The shroud integrated cover of claim 1, wherein at least one of the first and second wall members includes a protrusion engaged with the first permanent magnet.

3. A shroud integrated cover comprising:
a plate member; and
a first wall member formed on the plate member,
the first wall member being integrally formed with the plate member by press processing of the plate member, and
wherein the first wall member includes a groove engaged with a third wall member formed on a bottom plate of a hard disk drive.

4. A hard disk drive comprising:
a bottom plate including a disk rotating by a motor;
a cover including a first wall member formed thereon, the first wall member inducing an airflow generated at the time of rotation of the disk; and a first permanent magnet disposed between the first and second wall members, wherein the cover further includes a second wall member disposed to face the first wall member to thereby be paired with the first wall member.

5. The hard disk drive of claim 4, wherein at least one of the first and second wall members includes a protrusion engaged with the first permanent magnet.

6. A hard disk drive comprising:

a bottom plate including a disk rotating by a motor; and a cover including a first wall member formed thereon, the first wall member inducing an airflow generated at the time of rotation of the disk, wherein the bottom plate includes a third wall member facing the first wall member.

7. The hard disk drive of claim 6, wherein the first or third wall member includes a groove in which the first and third wall members are engaged with each other.

8. The hard disk drive of claim 6, wherein the cover further includes a second wall member disposed to face the first wall member to thereby be paired with the first wall member.

9. The hard disk drive of claim 8, further comprising a first permanent magnet disposed between the first and second wall members.

10. The hard disk drive of claim 9, wherein the bottom plate includes third and fourth wall members disposed to respectively face the first and second wall members.

11. The hard disk drive of claim 10, wherein the bottom plate further includes a second permanent magnet disposed between the third and fourth wall members.

\* \* \* \* \*